US012442791B2

(12) United States Patent
Takane et al.

(10) Patent No.: US 12,442,791 B2
(45) Date of Patent: Oct. 14, 2025

(54) ANALYSIS SYSTEM

(71) Applicant: ARKRAY, Inc., Kyoto (JP)

(72) Inventors: Eri Takane, Kyoto (JP); Yasumasa Honda, Kyoto (JP); Sakiko Ushiro, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 260 days.

(21) Appl. No.: 18/344,840

(22) Filed: Jun. 29, 2023

(65) Prior Publication Data
US 2024/0011944 A1 Jan. 11, 2024

(30) Foreign Application Priority Data

Jul. 5, 2022 (JP) .................................. 2022-108663
Jul. 8, 2022 (JP) .................................. 2022-110835

(51) Int. Cl.
*G01N 27/447* (2006.01)
(52) U.S. Cl.
CPC . *G01N 27/44756* (2013.01); *G01N 27/44791* (2013.01)
(58) Field of Classification Search
CPC ....... G01N 27/44756; G01N 27/44713; G01N 27/44791; B01L 2400/0415–0424
See application file for complete search history.

(56) References Cited

U.S. PATENT DOCUMENTS

| 5,169,511 A * | 12/1992 | Allington ......... G01N 27/44782 |
| | | 204/601 |
| 6,814,846 B1 * | 11/2004 | Berndt ................. B01J 19/0093 |
| | | 204/601 |
| 2009/0200168 A1 | 8/2009 | Falk-Jordan |
| 2016/0334367 A1 * | 11/2016 | Onuma .............. G01N 30/6095 |

FOREIGN PATENT DOCUMENTS

| JP | 6856495 B2 | 4/2021 | |
| WO | WO 0078454 A1 * | 12/2000 | ................ B01L 3/00 |

OTHER PUBLICATIONS

The extended European search report issued by the European Patent Office on Nov. 29, 2023, which corresponds to European Patent Application No. 23182267.7 and is related to U.S. Appl. No. 18/344,840.

* cited by examiner

*Primary Examiner* — Alexander S Noguerola
(74) *Attorney, Agent, or Firm* — Studebaker Brackett PLLC

(57) ABSTRACT

An electrophoresis device (analysis system) is an electrophoresis device that electrophoreses a sample in a capillary by applying a voltage to a pair of electrodes in a microchip (analysis tool) provided with the pair of electrodes at both ends of the capillary. The electrophoresis device includes: an installation unit installing the microchip, a first terminal and a second terminal respectively in contact with one and the other of the pair of electrodes of the microchip installed in the installation unit, a power supply device (voltage application unit) connected to the first terminal and the second terminal and applying a voltage in the capillary, and a terminal rotation unit (changing unit) changing a combination of electrical connections between the pair of electrodes, and the first terminal and the second terminal.

10 Claims, 14 Drawing Sheets

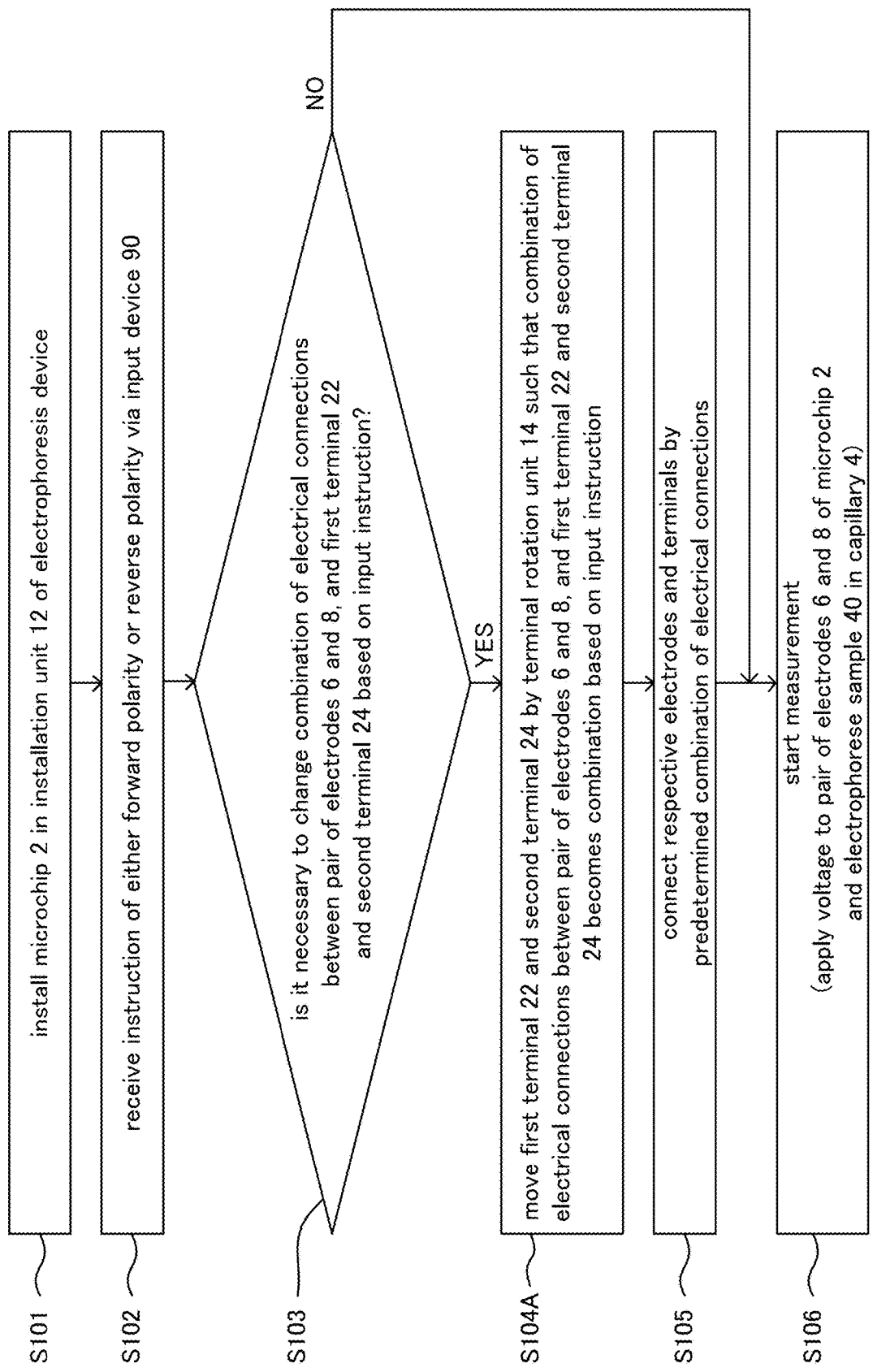

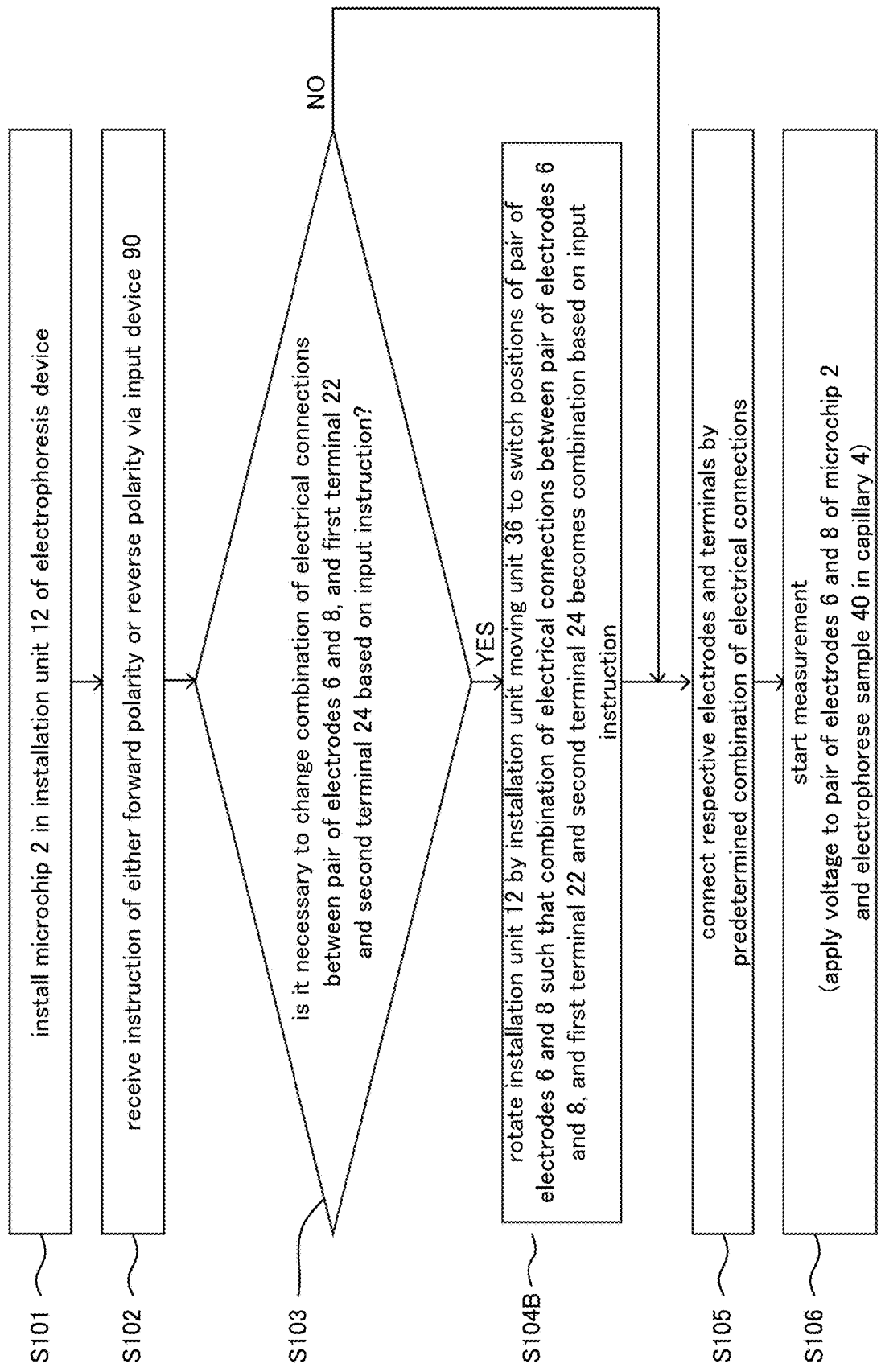

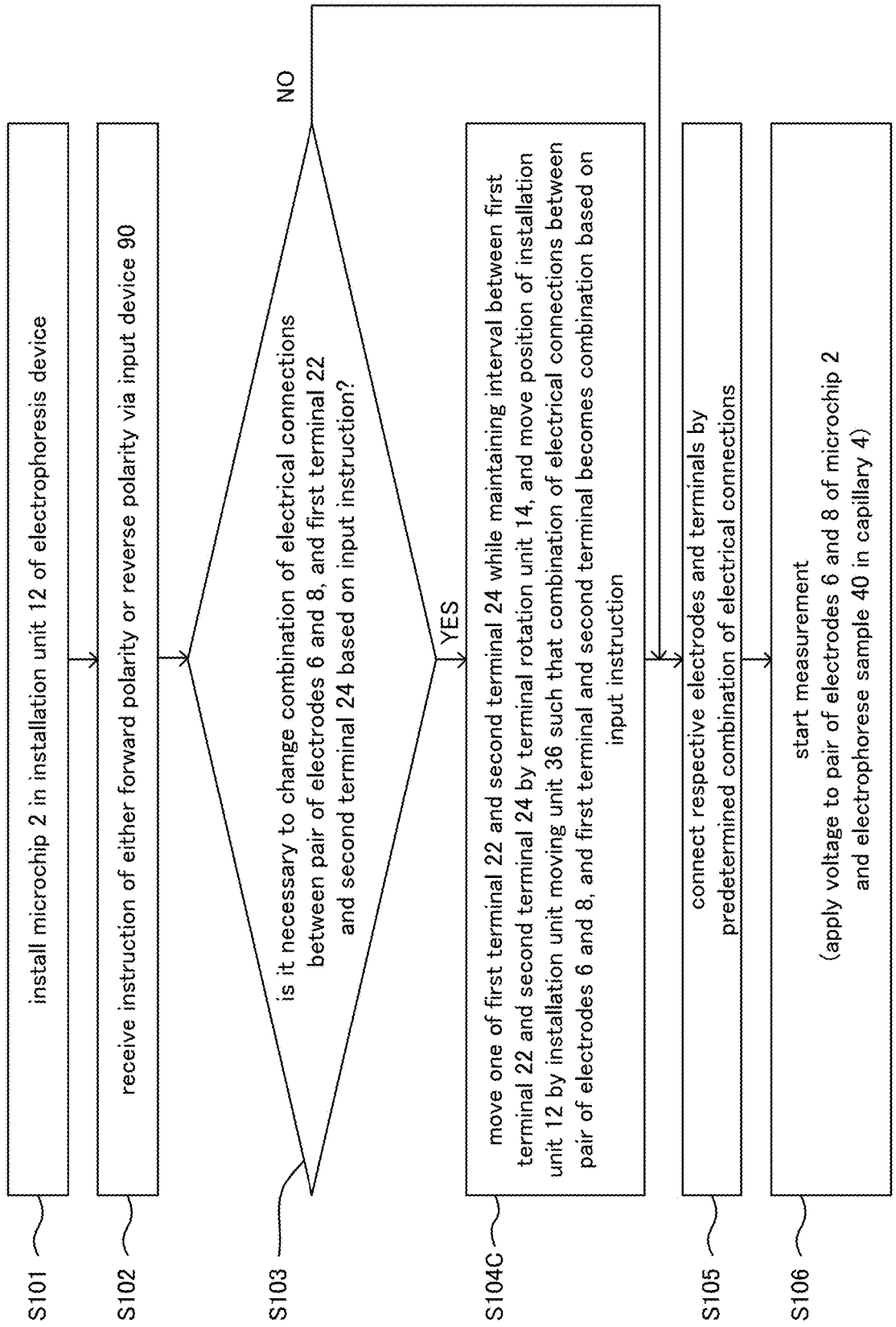

FIG.13A
FIG.13B
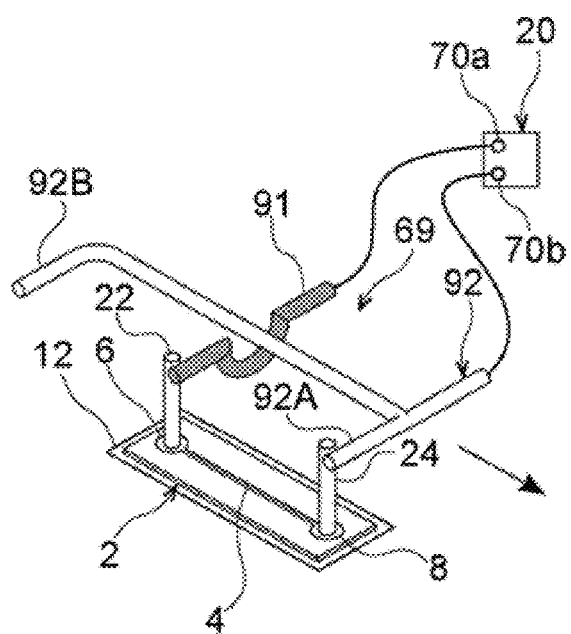
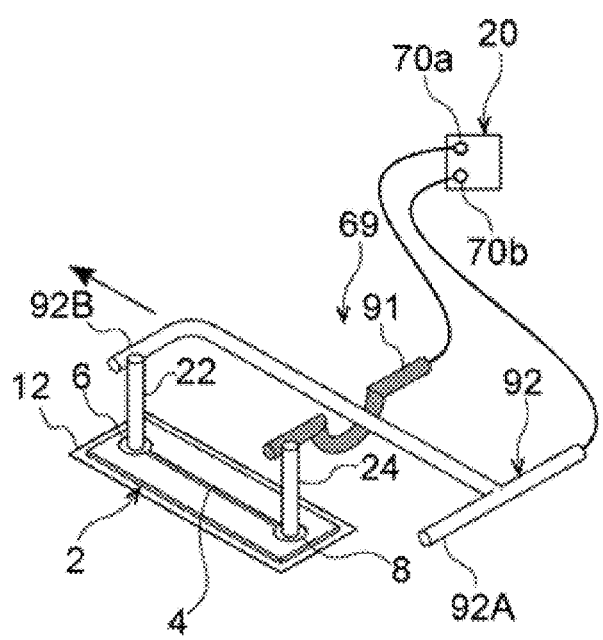

ANALYSIS SYSTEM

CROSS-REFERENCE TO RELATED APPLICATION

The present application claims priority under 35 U.S.C. § 119 to Japanese Patent Application No. 2022-108663 filed on Jul. 5, 2022, and Japanese Patent Application No. 2022-110835 filed on Jul. 8, 2022. The above applications are hereby expressly incorporated by reference, in its entirety, into the present application.

BACKGROUND

Technical Field

The present disclosure relates to an analysis system that performs electrophoresis.

Related Art

Japanese Patent No. 6856495 discloses an electrophoresis device. The electrophoresis device includes a power supply device, the power supply device generates a voltage (hereinafter, referred to as an "electrophoresis voltage") for electrophoresis, and in the electrophoresis device, the electrophoresis voltage is applied to the capillary.

The power supply device disclosed in Japanese Patent No. 6856495 applies an electrophoresis voltage in a direction defined by internal connection of the power supply device. Specifically, the voltage is applied such that an introduction-side terminal (probe) is in contact with an electrode of the introduction tank, a discharge-side terminal (probe) is in contact with an electrode of a discharge tank, and the introduction tank is positive and the discharge tank is negative.

However, there is a demand for a technique capable of selecting both one direction and the opposite direction of a polarity (voltage application direction) of the electrophoresis voltage.

An object of the disclosure is to make it possible to select both one direction and the opposite direction with respect to the polarity of the electrophoresis voltage.

SUMMARY

According to a first aspect, there is provided an analysis system configured to electrophorese a sample in a capillary by applying a voltage to a pair of electrodes in an analysis tool provided with the pair of electrodes at both ends of the capillary, the analysis system including: an installation unit in which the analysis tool is installed; a first terminal and a second terminal respectively in contact with one and the other of the pair of electrodes of the analysis tool installed in the installation unit; a voltage application unit connected to the first terminal and the second terminal and applying a voltage into the capillary; and a changing unit configured to change a combination of electrical connections between the pair of electrodes, and the first terminal and the second terminal.

In this analysis system, the combination of the electrical connections between the pair of electrodes of the analysis tool, and the first terminal and the second terminal can be changed by the changing unit. Therefore, it is possible to select both one direction and the opposite direction with respect to the polarity of the electrophoresis voltage applied from the first terminal and the second terminal to the analysis tool through the pair of electrodes by the voltage application unit.

According to a second aspect, the analysis system according to the first aspect further includes a terminal moving unit configured to moves the first terminal and the second terminal as the changing unit.

In this analysis system, the combination of the electrical connections between the pair of electrodes of the analysis tool, and the first terminal and the second terminal can be changed by moving the first terminal and the second terminal by the terminal moving unit.

According to a third aspect, in the analysis system according to the second aspect, the terminal moving unit switches positions of the first terminal and the second terminal.

In this analysis system, the terminal moving unit switches the positions of the first terminal and the second terminal, and thus, the combination of the electrical connections between the pair of electrodes of the analysis tool, and the first terminal and the second terminal can be changed. It is also possible to cope with a case in which the pair of electrodes is asymmetrically arranged in the analysis tool.

According to a fourth aspect, the analysis system according to the first aspect further includes an installation unit moving unit configured to move a position of the installation unit as the changing unit.

In this analysis system, the combination of the electrical connections between the pair of electrodes of the analysis tool, and the first terminal and the second terminal can be changed by moving the position of the installation unit by the installation unit moving unit.

According to a fifth aspect, in the analysis system according to the third aspect, the installation unit moving unit rotates the installation unit to switch positions of the pair of electrodes.

In this analysis system, the installation unit moving unit rotates the installation unit to switch the positions of the pair of electrodes, and thus, the combination of the electrical connections between the pair of electrodes of the analysis tool, and the first terminal and the second terminal can be changed.

According to a sixth aspect, the analysis system according to the first aspect further includes, as the changing unit, a terminal moving unit configured to move one of the first terminal and the second terminal while maintaining an interval between the first terminal and the second terminal, and an installation unit moving unit configured to move a position of the installation unit and switch a combination of the pair of electrodes and the first terminal and the second terminal.

In this analysis system, the combination of the pair of electrodes and the first terminal and the second terminal can be switched by moving one of the first terminal and the second terminal while maintaining the distance between the first terminal and the second terminal by the terminal moving unit and moving the position of the installation unit by the installation unit moving unit.

According to a seventh aspect, the analysis system according to the first aspect further includes a commutator provided between the first terminal and the second terminal as the changing unit.

In this analysis system, the combination of the electrical connections between the pair of electrodes of the analysis tool, and the first terminal and the second terminal can be changed by the commutator provided between the first terminal and the second terminal.

According to an eighth aspect, the analysis system according to the first aspect further includes a converter provided between the first terminal and the second terminal and the voltage application unit as the changing unit.

In this analysis system, the combination of the electrical connections between the pair of electrodes of the analysis tool, and the first terminal and the second terminal can be changed by the converter provided between the first terminal and the second terminal and the voltage application unit.

According to a ninth aspect, in the analysis system according to the first aspect, one of the first terminal and the second terminal is disposed symmetrically on both sides of the other, and the analysis system further includes an installation unit moving unit configured to move a position of the installation unit and switch a combination of the pair of electrodes and the first terminal and the second terminal as the changing unit.

In this analysis system, one of the first terminal and the second terminal is arranged symmetrically on both sides of the other. When the installation unit moving unit moves the position of the installation unit, the combination of the pair of electrodes and the first terminal and the second terminal can be switched.

According to a tenth aspect, there is provided an analysis method including: installing an analysis tool provided with a pair of electrodes at both ends of a capillary in an installation unit; receiving, via an input device, an instruction on one of a forward polarity and a reverse polarity of a voltage to be applied to the analysis tool; determining whether or not it is necessary to change a combination of electrical connections between the pair of electrodes, and a first terminal and a second terminal respectively in contact with one and the other of the pair of electrodes based on an input instruction; causing a changing unit to move the first terminal and the second terminal such that the combination of the electrical connections between the pair of electrodes, and the first terminal and the second terminal becomes a combination based on the input instruction in a case in which it is necessary to change the combination; connecting the pair of electrodes to the first terminal and the second terminal by a predetermined combination of electrical connections; and applying a voltage to the pair of electrodes of the analysis tool to electrophorese a sample in the capillary.

In this analysis system, the changing unit can change the combination of the electrical connections between the pair of electrodes of the analysis tool installed in the installation unit, and the first terminal and the second terminal. Therefore, it is possible to select both a forward polarity and a reverse polarity based on an instruction of either the forward polarity or the reverse polarity with respect to a voltage applied to the analysis tool received from an input device.

According to the disclosure, regarding the polarity of the electrophoresis voltage, both one direction and the opposite direction can be selected.

BRIEF DESCRIPTION OF THE DRAWINGS

Exemplary embodiments will be described in detail based on the following figures, wherein:

FIG. 7 is a flowchart illustrating a main procedure of a method of controlling the electrophoresis device according to the present exemplary embodiment.

FIG. 9 is a flowchart illustrating a main procedure of a method of controlling the electrophoresis device according to a first modification of the present exemplary embodiment.

FIG. 11 is a flowchart illustrating a main procedure of a method of controlling the electrophoresis device according to a second modification of the present exemplary embodiment.

FIG. 13A is a perspective view illustrating a state in which one direction is selected for the polarity of the electrophoresis voltage in a fourth modification.

FIG. 13B is a perspective view illustrating a state in which another direction is selected for the polarity of the electrophoresis voltage in the fourth modification.

DETAILED DESCRIPTION

Figure 1A:
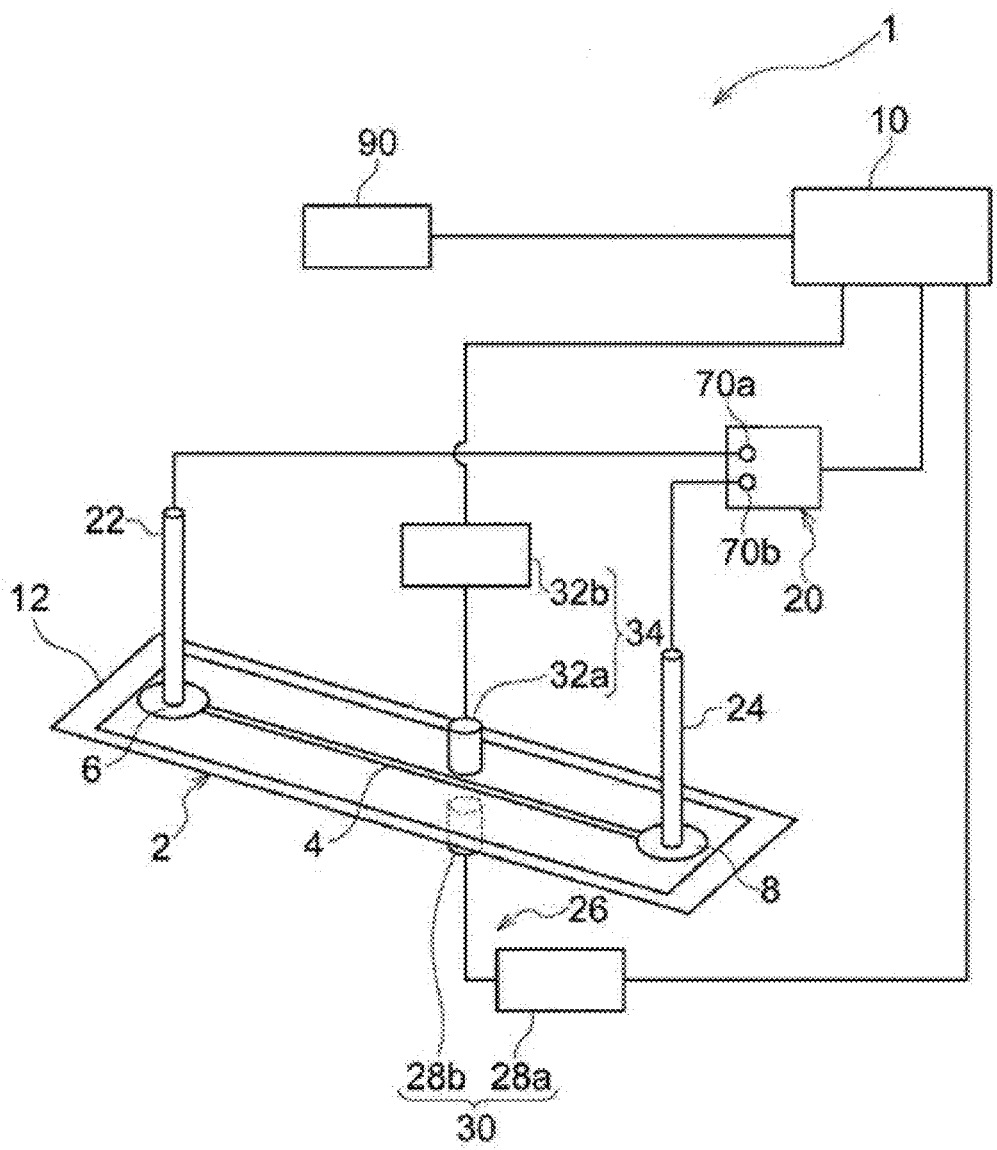
FIG. 1A is a diagram schematically illustrating an exemplary configuration of an electrophoresis device according to the present exemplary embodiment.

Hereinafter, modes for carrying out the disclosure will be described with reference to the drawings. Components denoted by the same reference numerals in the drawings mean the same components. Note that overlapping descriptions and reference numerals in exemplary embodiments described below may be omitted.

Figure 1B:
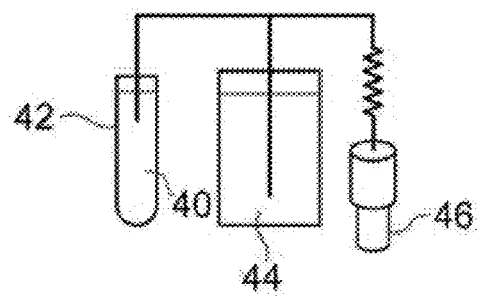
FIG. 1B is a diagram schematically illustrating an exemplary configuration of details related to the electrophoresis device according to the present exemplary embodiment.

FIG. 1A is a diagram schematically illustrating an exemplary configuration of an electrophoresis device according to the present exemplary embodiment. FIG. 1B is a diagram schematically illustrating an exemplary configuration of details related to the electrophoresis device according to the present exemplary embodiment.

Figure 2:
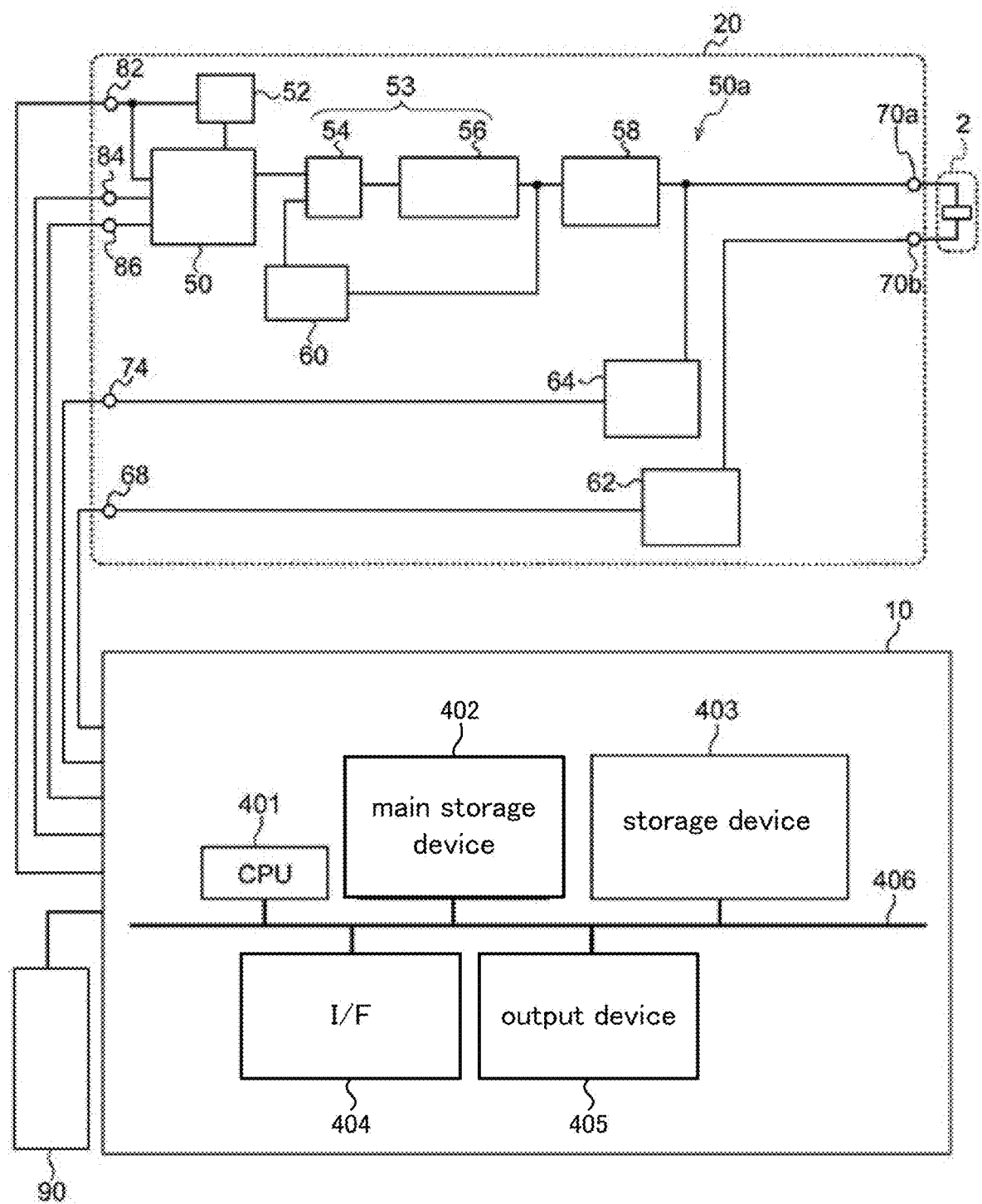
FIG. 2 is a block diagram schematically illustrating an example of a configuration of a power supply device according to the present exemplary embodiment.

An electrophoresis device 1 of the present exemplary embodiment is an example of an analysis system, and applies a voltage to a pair of electrodes 6 and 8 in a microchip 2 as an example of an analysis tool provided with the pair of electrodes 6 and 8 at both ends of a capillary 4 to electrophorese a sample in the capillary 4. Referring to FIGS. 1A, 1B, and 2, the electrophoresis device 1 includes a control device 10, a power supply device 20 as an example of a voltage application unit, a first terminal 22, a second terminal 24, an analysis device 26, an installation unit 12, and a terminal moving unit as an example of a changing unit, specifically, a terminal rotation unit 14 (see FIG. 6 to be described later). Note that the changing unit may be referred to as a "changing section", and the terminal moving unit may be referred to as a "terminal moving section".

The electrophoresis device 1 is an analysis device capable of performing a capillary electrophoresis method, and this analysis device can measure or analyze a sample of a measuring instrument, for example, a sample 40 that electrophoresis the capillary 4 of the microchip 2, using the capillary electrophoresis method. More specifically, the sample 40 is electrophoresed into the capillary 4 of the microchip 2. As an example of the measuring instrument of the disclosure, the microchip 2 is illustrated. The microchip 2 includes a sample 40 that includes a migrating body 44 and is in a state in which a sufficient current flows. The sample 40 includes the sample 40 containing the migrating body 44 or the sample 40 containing a solution of an electrophoretic liquid (liquid migrating body 44) diluted with the diluent. In a case in which dilution of the sample 40 is required for analysis, the sample 40 can be diluted.

The microchip 2 includes the capillary 4 serving as a channel, an introduction tank, and a discharge tank. The migrating body 44 fills the introduction tank, the capillary 4, and the discharge tank, and the sample 40 to be analyzed is introduced into the introduction tank. The electrophoretic liquid (the migrating body 44) functions as a buffer in the capillary electrophoresis method. An example of the electrophoretic liquid (migrating body 44) is 100 mM malic acid-arginine buffer (pH 5.0)+1.5% sodium chondroitin sulfate C, and an example of the sample 40 is blood. The microchip 2 is a disposable type chip, and is intended to be discarded, for example, once or after a specific number of analyses is completed. The microchip 2 is formed of, for example, a material such as silica.

The capillary 4 comprises a sample which gives rise to electrophoresis for analysis using the capillary electrophoresis method. In order to realize the capillary electrophoresis method, the capillary 4 has a tubular shape extending in one direction, and an example of dimensions thereof is illustrated below. The cross section of the tubular shape is preferably, for example, a circular shape having a diameter of 25 μm to 100 μm or a rectangular shape having sides of 25 μm to 100 μm, and the length of the tubular shape is preferably, for example, about 30 mm, but is not limited thereto.

The discharge tank is located downstream of the capillary 4 in the electrophoresis direction of the capillary electrophoresis. The sample 40 electrophoresed in the capillary 4 and the migrating body 44 are stored in the discharge tank assuming that the analysis is completed.

A first outer terminal 70a and a second outer terminal 70b are connected to the first terminal 22 and the second terminal 24, respectively. Specifically, the first terminal 22 is a terminal as a cathode, and the second terminal 24 is a terminal as an anode. That is, the power supply device 20 is connected to the first terminal 22 and the second terminal 24, and applies a voltage into the capillary 4. Each of the first terminal 22 and the second terminal 24 is, for example, a rod-shaped electrode made of a copper material (Cu) having a cross section diameter of 0.8 mm to 1.0 mm. As an example, the first terminal 22 is in contact with the electrode 6 electrically connected to the introduction tank, and the second terminal 24 is in contact with the electrode 8 electrically connected to the discharge tank. That is, the first terminal 22 and the second terminal 24 are in contact with one and the other of the pair of electrodes 6 and 8 of the microchip 2 installed in the installation unit 12, respectively. This makes it possible to apply a voltage to the capillary 4. In this exemplary arrangement, the first terminal 22 and the second terminal 24 can apply a voltage to the capillary 4, and the introduction tank and the discharge tank are located at one end and the other end of the capillary 4, respectively, so that the sample 40 can fill the capillary 4 of the microchip 2 and migrate. However, the arrangement of the first terminal 22 and the second terminal 24 is not limited thereto. In the disclosure, a combination of electrical connections between the pair of electrodes 6 and 8, and the first terminal 22 and the second terminal 24 can be changed by a changing unit to be described later. In FIG. 1 and FIGS. 6 to 14 described later, it is assumed that the electrode 6 is provided at the position of the introduction tank and the electrode 8 is provided at the position of the discharge tank for the sake of simplicity.

The first terminal 22 and the second terminal 24 may be connected to any portion of the microchip 2 as long as a voltage is applied to the capillary 4 and the sample 40 filling the capillary 4 of the microchip 2 can migrate. A preferable connection position is a position sandwiching the capillary 4 like the introduction tank and the discharge tank. In addition, the microchip 2 may be attached to a chip cartridge (not illustrated), the introduction tank and the discharge tank may be electrically connected to the two tubular conduction portions of the chip cartridge, respectively, and the first terminal 22 and the second terminal 24 may be connected to the outer surface of the tubular conduction portion from the side of the chip cartridge.

Figure 3:
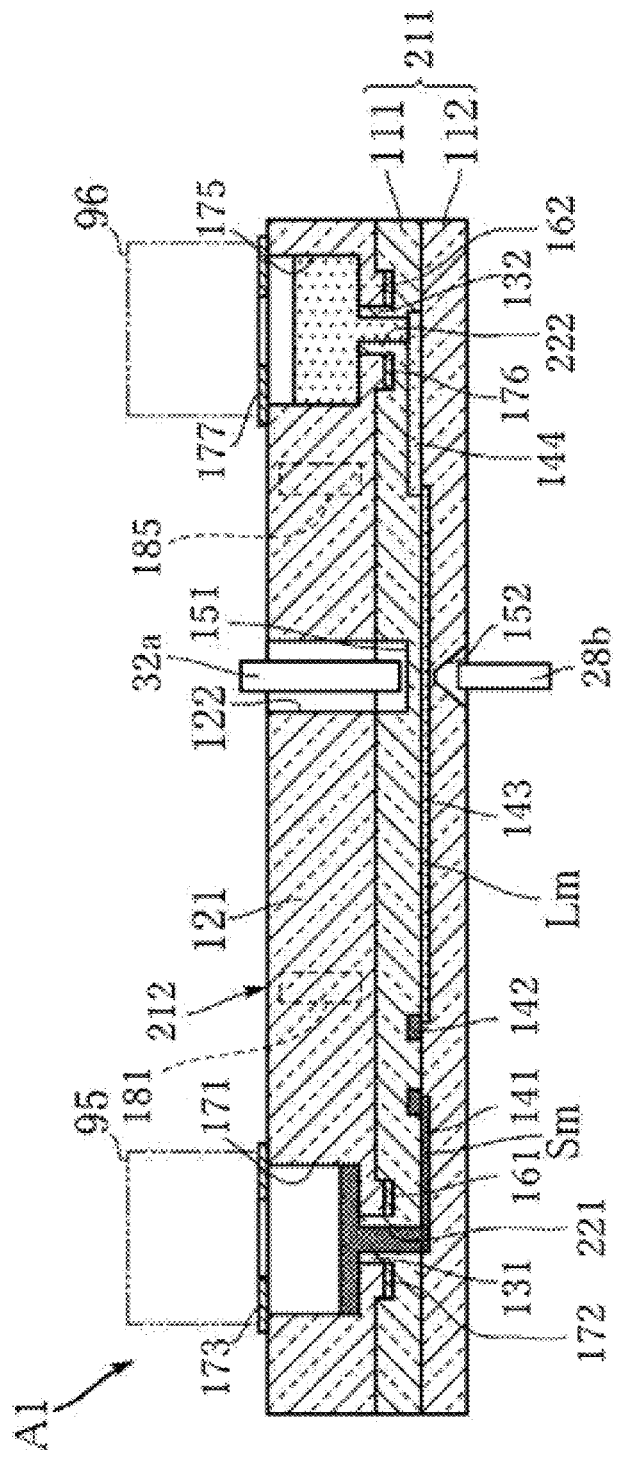
FIG. 3 is a cross-sectional view illustrating an analysis tool.
Figure 4:
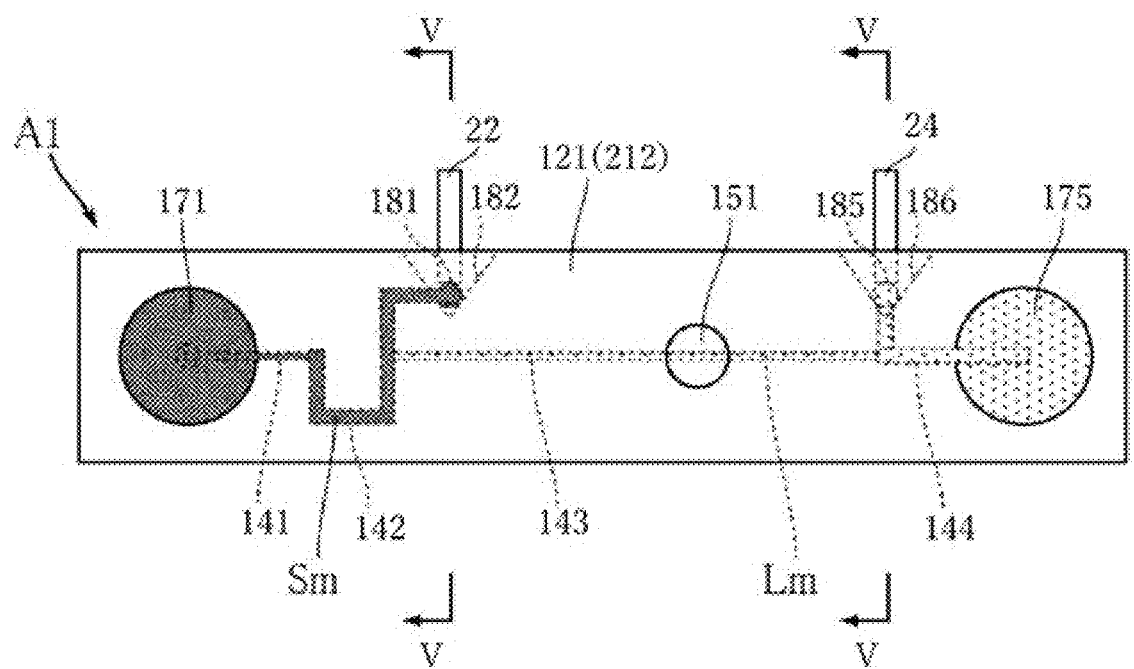
FIG. 4 is a plan view of a main part illustrating an analysis step.
Figure 5:
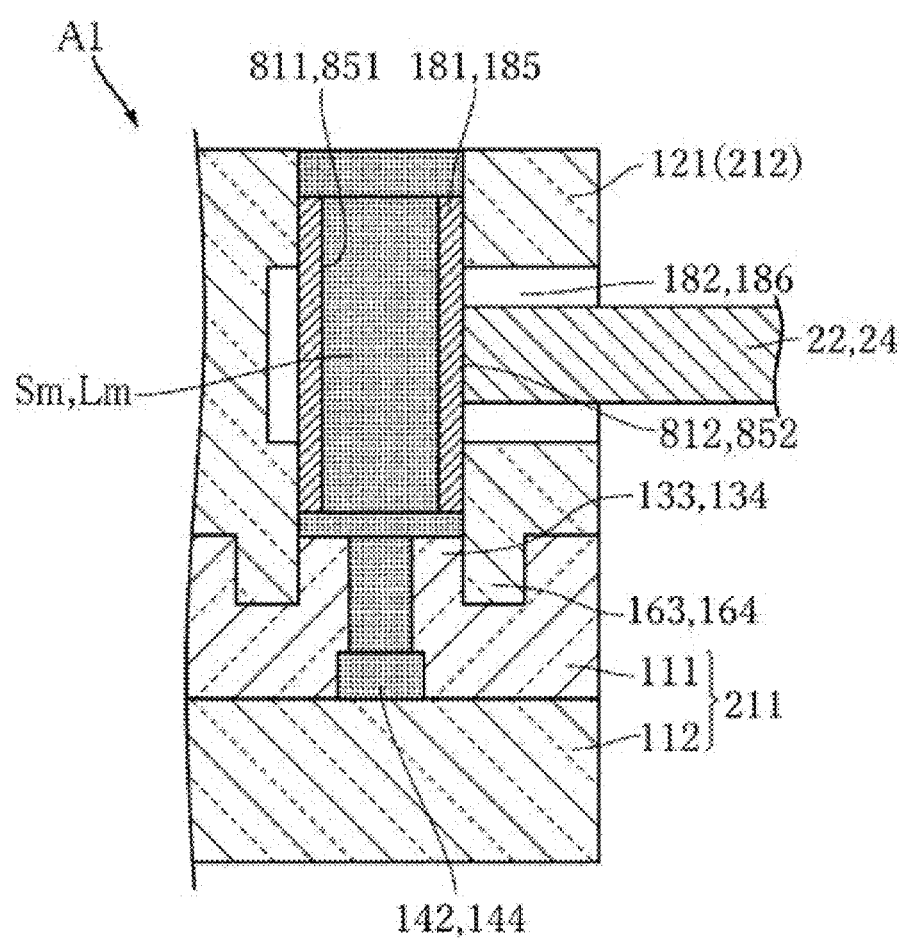
FIG. 5 is an enlarged cross-sectional view of a main part taken along line V-V in FIG. 4.

Here, an example of an analysis tool A1 corresponding to the microchip 2 will be described with reference to FIGS. 3 to 5. The analysis tool A1 includes a first unit 211 and a second unit 212. The analysis tool A1 has a separated state in which the first unit 211 and the second unit 212 are separated from each other and a connected state in which the first unit 211 and the second unit 212 are connected to each other. FIG. 5 illustrates the analysis tool A1 in the connected state.

The first unit 211 includes a first upper base material 111 and a first lower base material 112. Each of the first upper base material 111 and the first lower base material 112 is, for example, a substantially rectangular plate-like member, and the first upper base material 111 and the first lower base material 112 are bonded to each other. The first upper base material 111 and the first lower base material 112 are made of, for example, glass, fused silica, plastic, or the like. Unlike the present exemplary embodiment, the first unit 211 may be integrally formed.

The first unit 211 includes coupling portions 131, 132, 133, and 134, a sample collection unit 141, an introduction channel 142, an analysis unit 143, an introduction channel 144, an incidence recessed portion 151, and an emission recessed portion 152.

Each of the coupling portions 131, 132, 133, and 134 is a portion to be connected to an appropriate position of the second unit 212, and is for realizing connection between the first unit 211 and the second unit 212 in each portion. Each of the coupling portions 131, 132, 133, and 134 is a protruding portion protruding upward in the drawing, and a through hole penetrating each of the coupling portions in the vertical direction in the drawing is formed.

The sample collection unit 141 is a unit for collecting a predetermined amount of sample in the separated state and maintaining the predetermined amount of sample until the analysis tool A1 is connected. In the present exemplary embodiment, the sample collection unit 141 is a microchannel connected to the coupling portion 131, and in particular, in the present exemplary embodiment, it is intended to cause a predetermined amount of sample to stay in the sample collection unit 141 using capillary force.

The size of the sample collection unit 141 is not particularly limited, but for example, the width is 100 µm to 1000 µm, the depth is 100 µm to 1000 µm, and the length is 1 mm to 20 mm. The amount of the sample collected by the sample collection unit 141 is 0.01 µL to 20 µL. In the present exemplary embodiment, the sample collection unit 141 is provided by closing a fine groove formed in the first lower base material 112 with the first upper base material 111.

The introduction channel 142 is a channel leading from the sample collection unit 141 to the coupling portion 132 via one end of the analysis unit 143. The introduction channel 142 is, for example, a channel for introducing a diluted sample Sm into the analysis unit 143 and the coupling portion 131. In the present exemplary embodiment, the introduction channel 142 has a portion along a width direction perpendicular to the longitudinal direction of the analysis tool A1, and the analysis unit 143 is connected to the portion along the width direction. The introduction channel 142 is provided, for example, by closing a bent groove formed in the first upper base material 111 with the first lower base material 112.

The analysis unit 143 is a field where analysis is performed, and functions as a so-called capillary tube in the present exemplary embodiment in which the electrophoresis method is adopted. That is, the analysis unit 143 corresponds to the capillary 4 in FIG. 1. The analysis unit 143 extends linearly along the longitudinal direction of the analysis tool A1. One end of the analysis unit 143 is connected to the introduction channel 142, and the other end of the analysis unit 143 is connected to the introduction channel 144.

The size of the analysis unit 143 is not particularly limited, but for example, the width is 25 µm to 100 µm, the depth is 25 µm to 100 µm, and the length is 5 mm to 150 mm. In the present exemplary embodiment, the analysis unit 143 is provided by closing fine grooves formed in the first lower base material 112 with the first upper base material 111.

In the introduction channel 144, the other end of the analysis unit 143 is connected to a middle portion, and one end is connected to the coupling portion 132 and the other end is connected to the coupling portion 134. The introduction channel 144 is, for example, a channel for introducing an electrophoretic liquid Lm into the analysis unit 143 and the coupling portion 132. In the present exemplary embodiment, the introduction channel 144 is provided by closing a bent groove formed in the first upper base material 111 with the first lower base material 112.

The incidence recessed portion 151 is for allowing light to be used for analysis to be incident when analysis is performed by an electrophoresis method. In the present exemplary embodiment, the incidence recessed portion 151 is recessed inward from the upper surface of the first upper base material 111 in the drawing, and overlaps the analysis unit 143 in plan view. The incidence recessed portion 151 is, for example, a substantially cylindrical recessed portion.

The emission recessed portion 152 is for emitting light to be used for analysis when analysis is performed by the electrophoresis method. In the present exemplary embodiment, the emission recessed portion 152 is recessed inward from the lower surface of the first lower base material 112 in the drawing, overlaps the analysis unit 143 in plan view, and the center of the incidence recessed portion 151 and the center of the incidence recessed portion coincide with each other. The emission recessed portion 152 is, for example, a substantially conical recessed portion.

The second unit 212 includes a second base material 121. The second base material 121 is made of, for example, glass, fused silica, plastic, or the like. Unlike the present exemplary embodiment, the second unit 212 may be formed of an aggregate of a plurality of members.

The second unit 212 includes a through hole 122, a dilution liquid tank 171, an electrophoresis liquid tank 175, sealing members 172, 173, 176, and 177, a tubular conduction portion 181 and 185, and electrode recessed portions 182 and 186. The tubular conduction portions 181 and 185 corresponds to the electrodes 6 and 8 in FIG. 1.

The through hole 122 penetrates the second base material 121 in the thickness direction. The through hole 122 overlaps the incidence recessed portion 151 of the first unit 211 in plan view, and defines an integral space together with the incidence recessed portion 151.

The dilution liquid tank 171 is provided near one end of the second unit 212 in the longitudinal direction, and corresponds to an example of a specific liquid tank in which the above-described diluent as an example of a specific liquid is sealed. In the present exemplary embodiment, the dilution liquid tank 171 is configured using the through hole formed in the second base material 121.

The dilution liquid tank 171 is sealed by the sealing member 172 and the sealing member 173. The sealing member 172 and the sealing member 173 are fixed to the surface of the second base material 121 by a method capable of maintaining a sealed state such as adhesion. Specific configurations of the sealing member 172 and the sealing member 173 are not particularly limited, and a plate-like member and a film-like member are appropriately operated. In the present exemplary embodiment, a case in which a film-like member is adopted as the sealing member 172 and the sealing member 173 will be described as an example. An example of such a film-shaped member includes a so-called laminate film in which a resin layer and an aluminum layer are laminated.

The coupling portion 161 is provided below the dilution liquid tank 171 and is a part connected to the coupling portion 131 of the first unit 211. In the present exemplary embodiment, the coupling portion 161 protrudes downward in the drawing, and is provided with a through hole penetrating the inside in the vertical direction in the drawing. In the present exemplary embodiment, the sealing member 172 is fixed to the lower end of the coupling portion 161.

The electrophoresis liquid tank 175 is provided near the other end in the longitudinal direction of the second unit 212. In the present exemplary embodiment, the electrophoresis liquid tank 175 is configured using the through hole formed in the second base material 121.

The electrophoresis liquid tank 175 is sealed by the sealing member 176 and the sealing member 177. The sealing member 176 and the sealing member 177 are fixed to the surface of the second base material 121 by a method capable of maintaining a sealed state such as adhesion. Specific configurations of the sealing member 176 and the sealing member 177 are not particularly limited, and a plate-like member and a film-like member are appropriately operated. In the present exemplary embodiment, a case in which a film-like member is adopted as the sealing member 176 and the sealing member 177 will be described as an example. An example of such a film-shaped member includes a so-called laminate film in which a resin layer and an aluminum layer are laminated.

The coupling portion 162 is provided below the electrophoresis liquid tank 175 and is a part connected to the coupling portion 132 of the first unit 211. In the present exemplary embodiment, the coupling portion 162 protrudes downward in the drawing, and is provided with a through hole penetrating the inside in the vertical direction in the drawing. In the present exemplary embodiment, the sealing member 176 is fixed to the lower end of the coupling portion 162.

Here, in FIGS. 4 and 5, the tubular conduction portion 181, the electrode recessed portion 182, and the coupling portion 163 will be described. The tubular conduction portions 181 and 185 (an example of a conductor portion), the electrode recessed portion 182,186, and the coupling portions 163 and 164 have substantially the same configuration. The tubular conduction portion 181 is provided in a through hole penetrating the second base material 121 in the thickness direction. The tubular conduction portion 181 is made of a conductive material, for example, metal. The shape of the tubular conduction portion 181 is not particularly limited as long as it has a tubular shape, and in the present exemplary embodiment, a case in which the tubular conduction portion has a cylindrical shape will be described as an example.

The electrode recessed portion 182 is recessed inward from one end face in the width direction of the second base material 121. The electrode recessed portion 182 accommodates a part of the tubular conduction portion 181 near the center in the longitudinal direction. Meanwhile, both ends of the tubular conduction portion 181 are located inside the second base material 121 avoiding the electrode recessed portion 182. The shape of the electrode recessed portion 182 is not particularly limited, and is a triangular shape in plan view in the present exemplary embodiment.

The inner surface of the tubular conduction portion 181 constitutes a voltage application channel 811. The voltage application channel 811 is a channel for applying a voltage to the diluted sample Sm which is a liquid flowing inside. The tubular conduction portion 181 has an outer surface 812. Since the tubular conduction portion 181 is accommodated in the above-described electrode recessed portion 182, a part of the outer surface 812 is exposed to the outside.

The inner surface of the tubular conduction portion 185 constitutes a voltage application channel 851. The voltage application channel 851 is a channel for applying a voltage to the electrophoretic liquid Lm which is a liquid flowing inside. The tubular conduction portion 185 has an outer surface 852. Since the tubular conduction portion 185 is accommodated in the above-described electrode recessed portion 186, a part of the outer surface 852 is exposed to the outside.

The coupling portion 163 is a portion coupled to the coupling portion 133 of the first unit 211. In the present exemplary embodiment, the coupling portion 163 protrudes downward in the drawing and has a through hole.

When electrophoresis is performed, for example, the first terminal 22 is brought into contact with the tubular conduction portion 181 (electrode 6 in FIG. 1), and the second terminal 24 is brought into contact with the tubular conduction portion 185 (electrode 8 in FIG. 1). In the present exemplary embodiment, the combination of the electrical connections between the tubular conduction portions 181 and 185 corresponding to the pair of electrodes 6 and 8, and the first terminal 22 and the second terminal 24 can be changed by the changing unit to be described later.

The analysis device 26, for example, measures absorbance, and includes a light source device 30 (light emitting device 28a, irradiation device 28b) and a detection device 34 (light receiving device 32a, photoelectric conversion device 32b) as illustrated in FIG. 1.

The light source device 30 is configured to generate light having a wavelength corresponding to an object to be analyzed. The irradiation device 28b is coupled to the light emitting device 28a via a waveguide device such as an optical fiber, for example, and the waveguide device irradiates a part of the capillary 4 with the irradiation light from the light emitting device 28a. The light emitting device 28a is configured to generate light used for absorbance measurement, and may include, for example, a laser element. The light emitting device 28a can generate light having a wavelength of 415 nm, for example, in the case of analyzing the concentration of hemoglobin species such as hemoglobin A1c in blood, but the wavelength of the light emitting device 28a is not limited thereto. The detection device 34 receives light from the capillary 4 and generates an electric signal. The light receiving device 32a is connected to the photoelectric conversion device 32b via a waveguide device such as an optical fiber. The detection device 34 processes the electric signal from the photoelectric conversion device 32b.

The control device 10 controls operation of each unit of the electrophoresis device 1 to perform a series of control for realizing analysis by the electrophoresis device 1. As illustrated in FIG. 2, the control device 10 includes a central processing unit (CPU) 401, a main storage device 402, a storage device 403 such as a read only memory (ROM) and a random access memory (RAM), an interface 404, an output device 405, and a bus 406. Such a control device 10 can include, for example, a processing device such as a microprocessor. For example, the control device 10 can include a power port for receiving voltage supply from a power source (for example, a household outlet) external to the device.

Referring to FIG. 1, in a case in which measurement or analysis is performed by the electrophoresis device 1, first, the migrating body 44 (electrophoretic liquid) is introduced into the introduction tank from an introduction nozzle 46. This electrophoretic liquid (migrating body 44) fills the introduction tank, the capillary 4, and the discharge tank. A predetermined amount of the sample 40 (for example, blood) in a sample container 42 is introduced into the introduction tank from the introduction nozzle 46. When a voltage is applied to the first terminal 22 and the second terminal 24 using the power supply device 20, specific components such as hemoglobin A1c and hemoglobin A2 start to be separated and fractionated according to the charge by electrophoresis caused by the strength of the voltage and the direction of the polarity. According to the passage of time during which the voltage is applied to the sample 40, for example, a specific component is clearly separated and fractionated from other components. This separated and fractionated specific component moves through the capillary 4 toward the discharge tank. Since a part of the capillary 4 is located between the light source device 30 and the detection device 34, a specific component moving in the capillary 4 by electrophoresis passes through a part of the capillary 4.

When the irradiation device 28b irradiates a part of the capillary 4 with the irradiation light, a part of the irradiated light is absorbed by the specific component. The light receiving device 32a detects unabsorbed light as transmitted light. The detection device 34 receives a signal indicating a light amount (transmission amount) detected by the photoelectric conversion device 32b, and the concentration of the specific component of the sample 40 is detected by the principle of absorbance measurement based on the light amount of the irradiation light and the light amount of the transmitted light.

The electrophoresis device 1 includes the power supply device 20 configured to generate an electrophoresis voltage, and an input device 90 configured to receive designation of an operation mode indicating either a forward polarity or a reverse polarity. The power supply device 20 includes the first outer terminal 70a and the second outer terminal 70b configured to apply an electrophoresis voltage to the capillary 4. The power supply device 20 can select application of an electrophoresis voltage with the forward polarity (for example, the first outer terminal 70a is set to a positive electrode having a high potential, and the second outer terminal 70b is set to a negative electrode having a low potential.) or the reverse polarity (for example, the first outer terminal 70a is set to a negative electrode having a low potential, and the second outer terminal 70b is set to a positive electrode having a high potential) between the first outer terminal 70a and the second outer terminal 70b. According to the electrophoresis device 1, it is possible to perform the electrophoresis measurement by designating the operation mode that defines the forward polarity and reverse polarity. That is, electrophoresis designating one operation mode of voltage application in two polarity directions of the forward polarity and reverse polarity can be performed on the sample 40. The electrophoresis device 1 further includes the light source device 30 provided to irradiate the capillary 4 with light, and the detection device 34 optically coupled to the light source device 30.

FIG. 2 is a block diagram schematically illustrating an example of a configuration of the power supply device 20. The power supply device 20 is schematically configured for the electrophoresis device 1 using a measuring instrument having the capillary 4, and generates a voltage of several kilovolts, for example, about 1.5 kV in order to generate a voltage necessary for the capillary electrophoresis method. The power supply device 20 includes the first outer terminal 70a as an output terminal and the second outer terminal 70b as an input terminal.

The power supply device 20 includes a voltage generation section 50a. The voltage generation section 50a includes a high-voltage generation circuit 53, and may further include, for example, an input control circuit 50, an enable circuit 52, an output protection circuit 58, an output voltage control circuit 60, a current detection circuit 62, and a voltage detection circuit 64. The high-voltage generation circuit 53 is configured to generate a voltage (hereinafter, referred to as "electrophoresis voltage") for electrophoresis, and in the present example, can include an inverter transformer circuit 54 as a generation circuit and a Cockcroft-Walton circuit 56 (CCW, hereinafter referred to as a "CCW circuit") as an amplifier circuit. According to the power supply device 20, the high-voltage generation circuit 53 enables the amplification circuit to amplify the voltage provided from the generation circuit that generates the voltage, and generates the voltage for electrophoresis measurement. Note that Japanese Patent No. 6856495 can be referred to for the power supply device 20.

The first outer terminal 70a and the second outer terminal 70b are configured to apply an electrophoresis voltage to the capillary 4, and are provided to the power supply device 20. In other words, the power supply device 20 is connected to the microchip 2 via the first outer terminal 70a and the second outer terminal 70b. In addition, the power supply device 20 includes a second output electrode 68, a third output electrode 74, a second input electrode 82, a third input electrode 84, and a fourth input electrode 86, and is connected to the control device via these electrodes.

In FIG. 1, the installation unit 12 is a unit where the microchip 2 is installed. The installation unit 12 has a recessed portion or the like corresponding to the size of the microchip 2, and the microchip 2 can be installed at a predetermined position. The installation unit 12 is, for example, a fixed type.

Figure 6A:
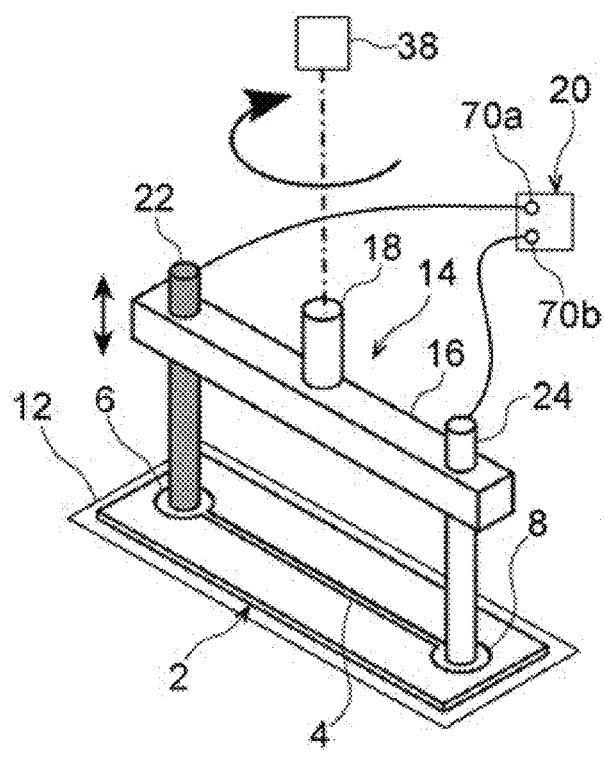
FIG. 6A is a perspective view illustrating a state in which one direction is selected for a polarity of the electrophoresis voltage.
Figure 6B:
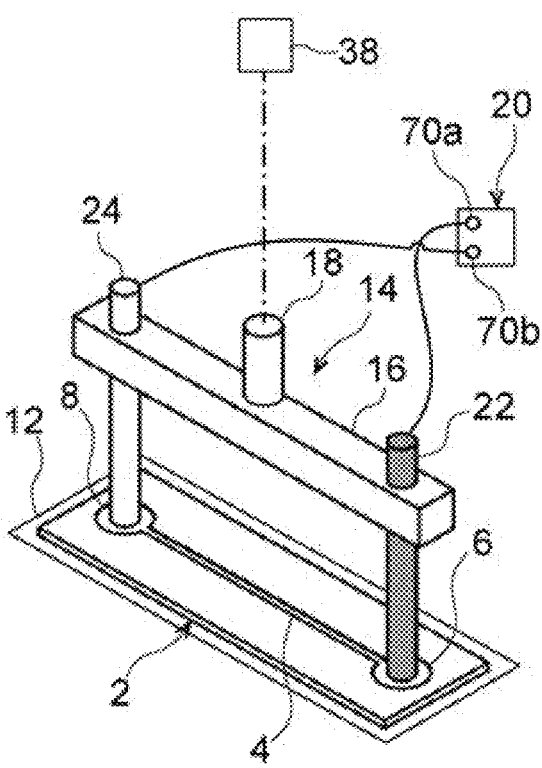
FIG. 6B is a perspective view illustrating a state in which another direction is selected for the polarity of the electrophoresis voltage by a terminal moving unit.

In FIG. 6, the terminal rotation unit 14 is an example of a terminal moving unit that moves the first terminal 22 and the second terminal 24. The first terminal 22 is connected to the first outer terminal 70a of the power supply device 20. The second terminal 24 is connected to the second outer terminal 70b of the power supply device 20. The terminal moving unit is an example of a changing unit that changes the combination of the electrical connections between the pair of electrodes 6 and 8, and the first terminal 22 and the second terminal 24. The terminal rotation unit 14 is configured to rotate, for example, a holding member 16 that holds the first terminal 22 and the second terminal 24 by a drive unit 38 such as a motor. The holding member 16 is formed in, for example, a straight rod shape, and holds the first terminal 22 and the second terminal 24 at both ends. A rotation shaft 18 is provided at the center of the first terminal 22 and the second terminal 24. The drive unit 38 is controlled by the control device 10 to rotate the holding member 16 by rotating the rotation shaft 18. As illustrated in FIGS. 6A and 6B, when the holding member 16 rotates 180°, the positions of the first terminal 22 and the second terminal 24 can be exchanged. In addition, the drive unit 38 is controlled by the control device 10, and can reciprocate the holding member 16 in the vertical direction such that the first terminal 22 and the second terminal 24 are in contact with and separated from the pair of electrodes 6 and 8.

Note that the terminal moving unit is not limited to the terminal rotation unit 14, and may be any as long as it can separately move the first terminal 22 and the second terminal 24. In this case, it is also possible to cope with a case in which the pair of electrodes 6 and 8 is asymmetrically arranged in the microchip 2.

(Operation)

The electrophoresis device 1 according to the present exemplary embodiment is configured as described above, and its operation will be described below along the flowchart of FIG. 7. In Step S101, the microchip 2 is installed in the installation unit 12 of the electrophoresis device. At this time, the microchip 2 is installed such that positions (attachment direction of the microchip 2) of the pair of electrodes 6 and 8 in the microchip 2 are in a predetermined state. In Step S102, an instruction of either the forward polarity or the reverse polarity is received via the input device 90.

In Step S103, it is determined whether it is necessary to change the combination of the electrical connections between the pair of electrodes 6 and 8, and the first terminal 22 and the second terminal 24 based on the instruction input via the input device 90. In a case in which the change is not necessary, in Step S105, the respective electrodes 6 and 8 are connected to the first terminal 22 and the second terminal 24 by a predetermined combination of electrical connections (FIG. 6A). Then, in Step S106, measurement is started. In the measurement, a voltage is applied to the pair of electrodes 6 and 8 of the microchip 2, and the sample 40 in the capillary 4 is electrophoresed.

Meanwhile, in Step S103, in a case in which it is necessary to change the combination of the electrical connections between the pair of electrodes 6 and 8, and the first terminal 22 and the second terminal 24, in Step S104A, the terminal rotation unit 14 moves the first terminal 22 and the second terminal 24 such that the combination of the electrical connections between the pair of electrodes 6 and 8, and the first terminal 22 and the second terminal 24 becomes the combination based on the input instruction (FIG. 6B). Specifically, the drive unit 38 of the terminal rotation unit 14 rotates the rotation shaft 18 to rotate the holding member 16, and the positions of the first terminal 22 and the second terminal 24 held by the holding member 16 are switched.

As a result, it is possible to change the combination of the electrical connections between the pair of electrodes 6 and 8 of the microchip 2, and the first terminal 22 and the second terminal 24. As an example, the electrical connection state is changed from a state in which the first terminal 22 is in contact with the electrode 6 and the second terminal 24 is in contact with the electrode 8 to a state in which the first terminal 22 is in contact with the electrode 8 and the second terminal 24 is in contact with the electrode 6. Therefore, regarding the polarity of the electrophoresis voltage applied from the first terminal 22 and the second terminal 24 to the microchip 2 through the pair of electrodes 6 and 8 by the power supply device 20, both one direction and the opposite direction can be selected.

The terminal moving unit need not be configured to rotate the holding member 16 like the terminal rotation unit 14. When the terminal moving unit switches the positions of the first terminal 22 and the second terminal 24, it is possible to change the combination of the electrical connections between the pair of electrodes 6 and 8 of the microchip 2, and the first terminal 22 and the second terminal 24. In this case, it is also possible to cope with a case in which the pair of electrodes 6 and 8 is asymmetrically arranged in the microchip 2.

When the terminal rotation unit 14 rotates the holding member 16, the first terminal 22 and the second terminal 24 are raised and separated from the pair of electrodes 6 and 8, and after the rotation, the first terminal 22 and the second terminal 24 are lowered and brought into contact with the pair of electrodes 6 and 8. When the first terminal 22 and the second terminal 24 are separated from the pair of electrodes 6 and 8, the first terminal 22 and the second terminal 24 may be moved, or the installation unit 12 may be moved. Step S101 may be performed after Step S104A. That is, the microchip 2 may be installed in the installation unit 12 after the arrangement of the first terminal 22 and the second terminal 24 is changed.

First Modification

Figure 8:
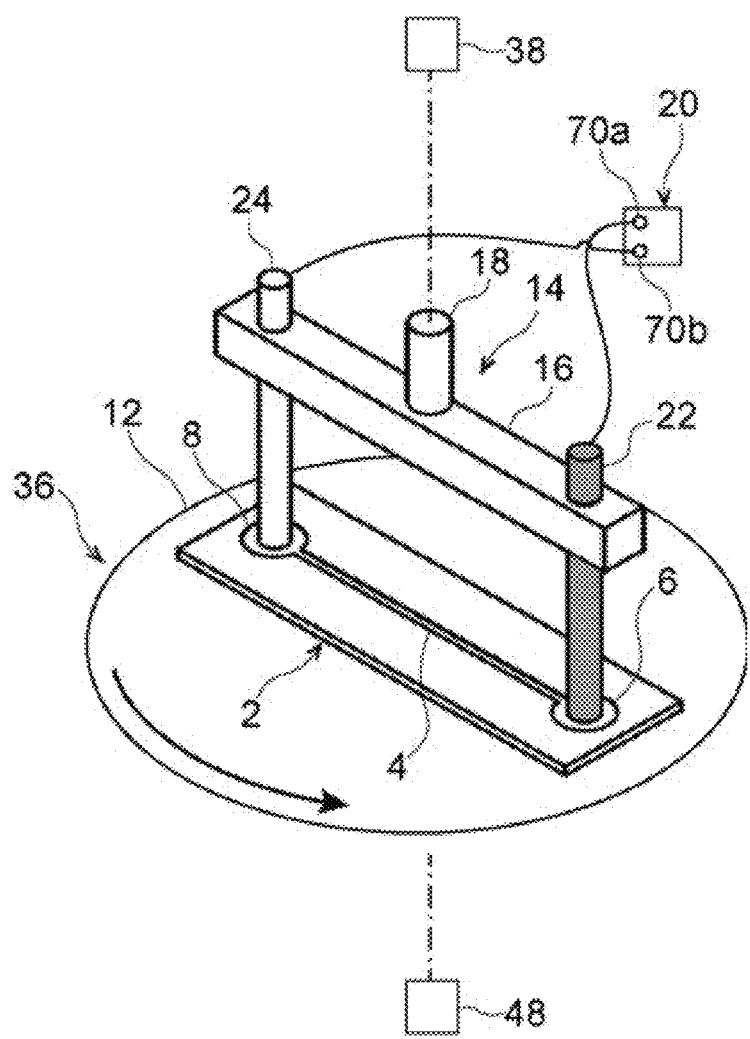
FIG. 8 is a perspective view illustrating an installation unit moving unit according to a first modification.

In FIG. 8, in a first modification, an installation unit moving unit 36 that moves the position of the installation unit 12 is provided as a changing unit. The installation unit moving unit 36 is configured to rotate the installation unit 12 to switch the positions of the pair of electrodes 6 and 8, for example. Specifically, the installation unit moving unit 36 is a rotary table that rotates the installation unit 12 around the center of the electrodes 6 and 8 between the pair of electrodes 6 and 8 in the microchip 2. The installation unit moving unit 36 is rotationally driven by a drive unit 48 such as a motor controlled by the control device 10.

The first terminal 22 is connected to the first outer terminal 70a of the power supply device 20. The second terminal 24 is connected to the second outer terminal 70b of the power supply device 20. The drive unit 38 is controlled by the control device 10, and can reciprocate the holding member 16 in a direction in which the first terminal 22 and the second terminal 24 are in contact with the pair of electrodes 6 and 8 and in a direction in which the first terminal and the second terminal are separated from each other. Although the first terminal 22 and the second terminal 24 are held by the holding member 16, the positions of the first terminal 22 and the second terminal 24 are not switched.

The operation of the first modification, particularly the operation of Step S104B will be described along the flowchart of FIG. 9. Steps S101, S102, S103, S105, and S106 are the same as those in the above exemplary embodiment (FIG. 7), and thus description thereof is omitted. Step S104B is a step performed in a case in which it is necessary to change the combination of the electrical connections between the pair of electrodes 6 and 8, and the first terminal 22 and the second terminal 24 in Step S103.

In Step S104B, the installation unit moving unit 36 moves the position of the installation unit 12 by the installation unit moving unit 36 such that the combination of the electrical connections between the pair of electrodes 6 and 8, and the first terminal 22 and the second terminal 24 becomes a combination based on the input instruction. Specifically, the installation unit moving unit 36 rotates the installation unit 12 to switch the positions of the pair of electrodes 6 and 8. When the installation unit 12 is rotated, the first terminal 22 and the second terminal 24 are separated from the pair of electrodes 6 and 8, and the first terminal 22 and the second terminal 24 are brought into contact with the pair of electrodes 6 and 8 after the rotation. As a result, it is possible to change the combination of the electrical connections between the pair of electrodes 6 and 8 of the microchip 2, and the first terminal 22 and the second terminal 24.

Second Modification

Figure 10A:
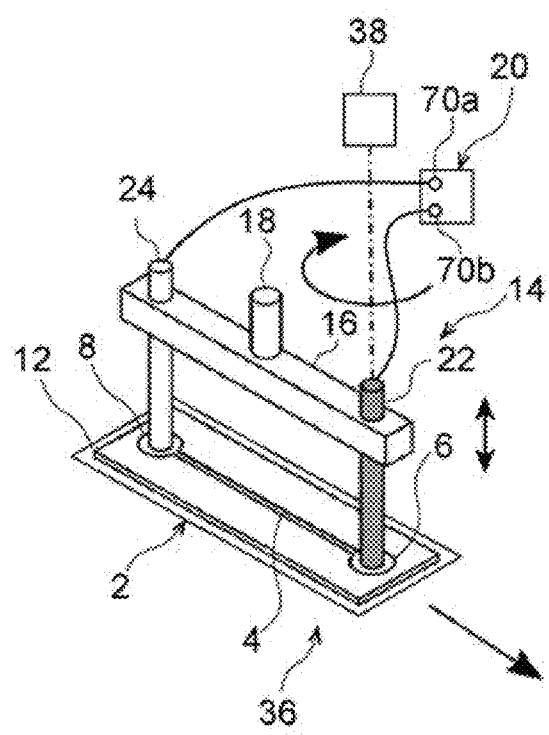
FIG. 10A is a perspective view illustrating a state in which one direction is selected for the polarity of the electrophoresis voltage in a second modification.
Figure 10B:
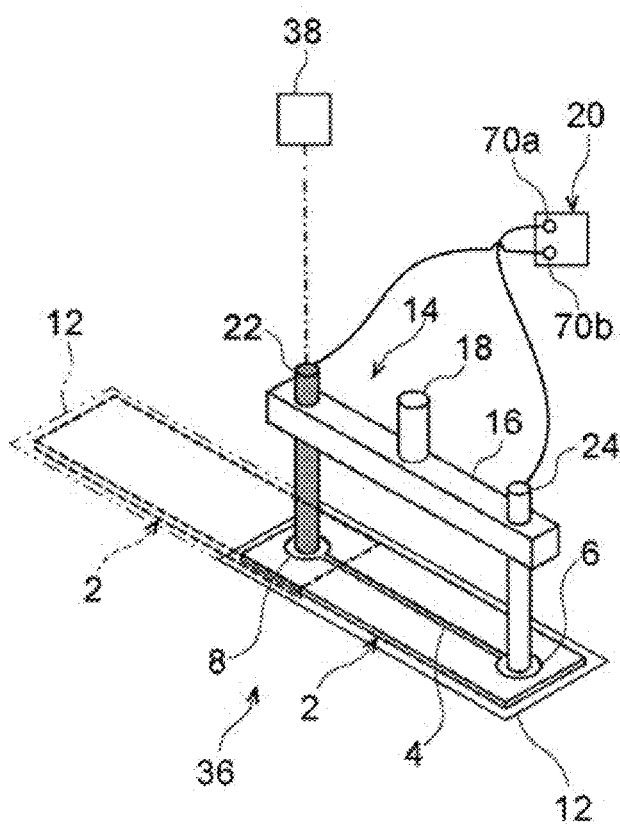
FIG. 10B is a perspective view illustrating a state in which another direction is selected for the polarity of the electrophoresis voltage in the second modification.

In FIGS. 10A and 10B, in a second modification, the terminal rotation unit 14 as the terminal moving unit and the installation unit moving unit 36 are included as the changing units. The terminal rotation unit 14 moves one of the first terminal 22 and the second terminal 24 while maintaining an interval therebetween. For example, the first terminal 22 and the second terminal 24 are held by the holding member 16, and the terminal rotation unit 14 rotates the holding member 16 by 180° about the first terminal 22 by the drive unit 38 controlled by the control device 10. As a result, the first terminal 22 does not move, and the second terminal 24 moves to the opposite side of the first terminal 22 as viewed from the original position.

The first terminal 22 is connected to the first outer terminal 70a of the power supply device 20. The second terminal 24 is connected to the second outer terminal 70b of the power supply device 20. The drive unit 38 is controlled by the control device 10, and can reciprocate the holding member 16 in a direction in which the first terminal 22 and the second terminal 24 are in contact with the pair of electrodes 6 and 8 and in a direction in which the first terminal and the second terminal are separated from each other.

The operation of the second modification, particularly the operation of Step S104C will be described along the flowchart of FIG. 11. Steps S101, S102, S103, S105, and S106 are the same as those in the above exemplary embodiment (FIG. 7), and thus description thereof is omitted. Step S104C is a step performed in a case in which it is necessary to change the combination of the electrical connections between the pair of electrodes 6 and 8, and the first terminal 22 and the second terminal 24 in S103.

In Step S104C, the terminal rotation unit 14 moves one of the first terminal 22 and the second terminal 24 while maintaining the interval between the first terminal 22 and the second terminal 24, and the installation unit moving unit 36 further moves the position of the installation unit 12 such that the combination of the electrical connections between the pair of electrodes 6 and 8, and the first terminal and the second terminal becomes the combination based on the input instruction. Specifically, the installation unit moving unit 36 is, for example, a slide table, and is controlled by the control device 10 to move the installation unit 12 in the longitudinal direction (the direction in which the pair of electrodes 6 and 8 is connected) of the microchip 2. As the installation unit moving unit 36, for example, a ball screw or a cylinder device can be used. The movement distance is a distance between the centers of the pair of electrodes 6 and 8. As the installation unit moving unit 36, for example, a ball screw or a cylinder device can be used.

In this modification, it is possible to switch the combination of the pair of electrodes 6 and 8 and the first terminal 22 and the second terminal 24 by moving (rotating the holding member 16 by 180° about the first terminal 22) one of the first terminal 22 and the second terminal 24 while maintaining the interval between the first terminal 22 and the second terminal 24 by the terminal rotation unit 14 as the terminal moving unit and moving the position of the installation unit 12 by the installation unit moving unit 36. When the holding member 16 is rotated and the installation unit 12 is moved by the installation unit moving unit 36, the first terminal 22 and the second terminal 24 are separated from the pair of electrodes 6 and 8, and the first terminal 22 and the second terminal 24 are brought into contact with the pair of electrodes 6 and 8 after the rotation of the holding member 16 and the movement of the installation unit 12.

Third Modification

Figure 12:
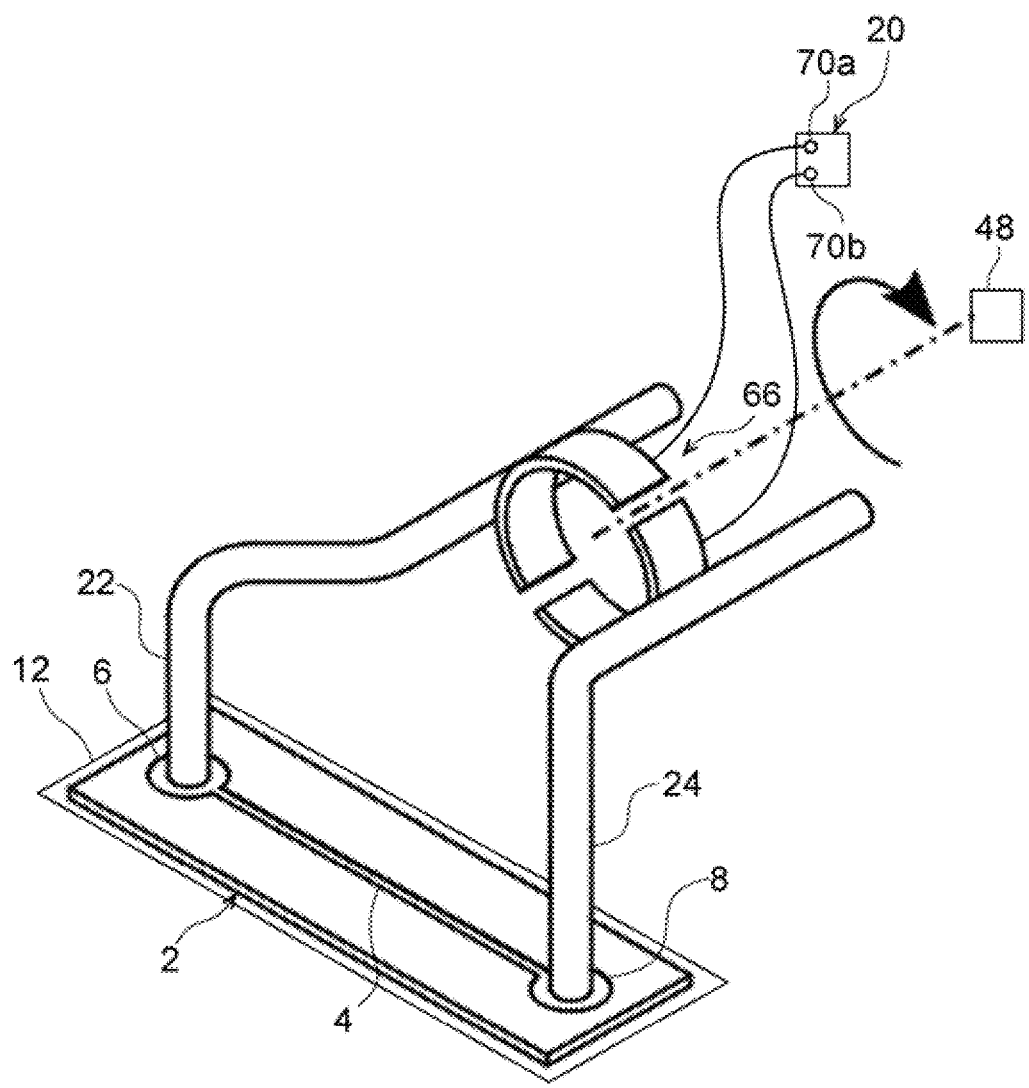
FIG. 12 is a perspective view illustrating a configuration in which a commutator is provided between a first terminal and a second terminal in a third modification.

In FIG. 12, in a third modification, a commutator 66 provided between the first terminal 22 and the second terminal 24 is provided as the changing unit. One of the electrodes in the commutator 66 is connected to the first outer terminal 70a of the power supply device 20, and the other electrode is connected to the second outer terminal 70b of the power supply device 20. The commutator 66 is rotationally driven by the drive unit 48 controlled by the control device 10 in a state of being in contact with the first terminal 22 and the second terminal 24, and the polarities of the first terminal 22 and the second terminal 24 are switched depending on the position. In this modification, for example, while a state in which the first terminal 22 is in contact with the electrode 6 and the second terminal 24 is in contact with the electrode 8 is maintained, the combination of the electrical connections between the pair of electrodes 6 and 8, and the first terminal 22 and the second terminal 24 can be changed by the commutator 66 provided between the first terminal 22 and the second terminal 24.

Fourth Modification

In FIGS. 13A and 13B, in a fourth modification, a converter 69 is provided as the changing unit. The converter 69 is provided between the first terminal 22 and the second terminal 24, and the power supply device 20 (FIG. 1), and includes a first armature 91 and a second armature 92. For example, the first armature 91 is connected to the first outer terminal of the power supply device 20, and the second armature 92 is connected to the second outer terminal 70b of the power supply device 20. The second armature 92 branches into branch portions 92A and 92B. The branch portions 92A and 92B are arranged so as to sandwich the first armature 91 in the longitudinal direction (the direction in which the pair of electrodes 6 and 8 is connected) of the microchip 2. A distance between the first armature 91 and the branch portion 92A, a distance between the first armature 91 and the branch portion 92B, a distance between the first terminal 22 and the second terminal 24, and a distance between the electrodes 6 and 8 are equal to each other.

The first armature 91 is configured to be elastically contactable with the first terminal 22 or the second terminal 24. Similarly, the second armature 92 is configured to be elastically contactable with the first terminal 22 or the second terminal 24.

Then, the converter 69 is movable in the longitudinal direction (the direction in which the pair of electrodes 6 and 8 is connected) of the microchip 2 by a drive unit (not illustrated). At this time, the first armature 91 and the second armature 92 may move integrally or may move separately.

In this modification, the converter 69 is provided between the first terminal 22 and the second terminal 24, and the power supply device 20 (FIG. 1). In FIG. 13A, the first armature 91 in the converter 69 is in contact with the first terminal 22, and the branch portion 92A of the second armature 92 is in contact with the second terminal 24. When the converter 69 is moved from this state in the longitudinal direction (the direction in which the pair of electrodes 6 and 8 is connected) of the microchip 2, as illustrated in FIG. 13B, the first armature 91 comes into contact with the second terminal 24, and the branch portion 92B of the second armature 92 comes into contact with the first terminal 22. In this modification, the combination of the electrical connections between the pair of electrodes 6 and 8 of the microchip 2, and the first terminal 22 and the second terminal 24 can be changed in this manner.

Fifth Modification

Figure 14A:
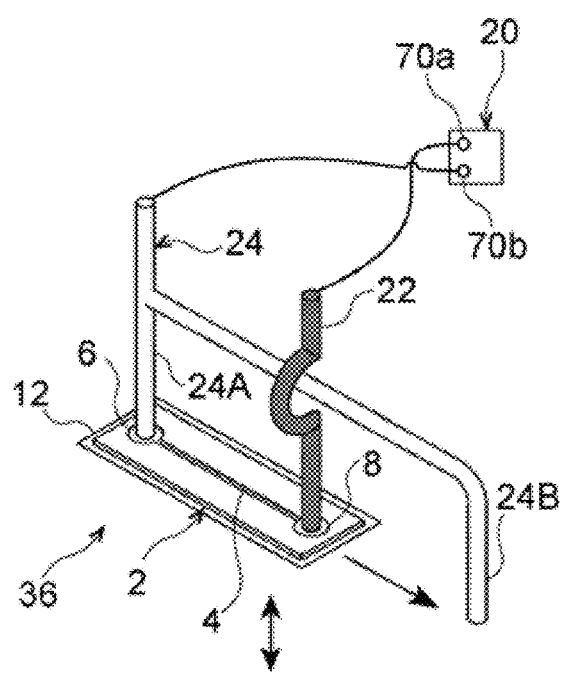
FIG. 14A is a perspective view illustrating a state in which one direction is selected for the polarity of the electrophoresis voltage in a fifth modification.
Figure 14B:
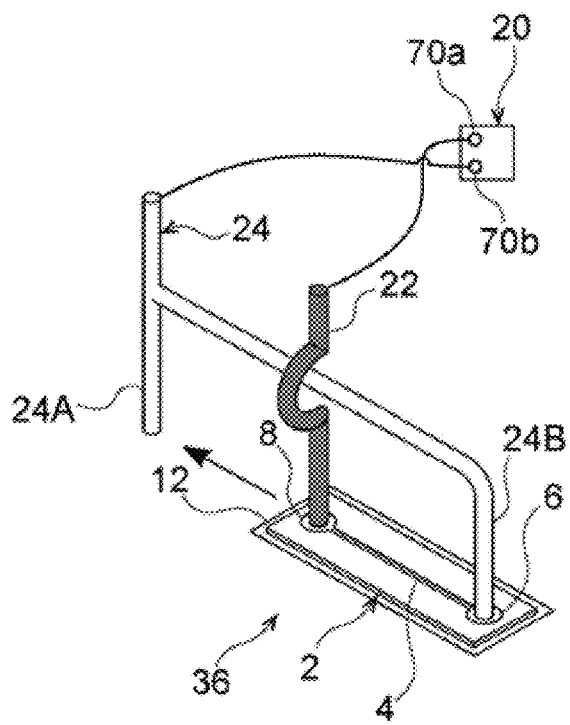
FIG. 14B is a perspective view illustrating a state in which another direction is selected for the polarity of the electrophoresis voltage in the fifth modification.

In FIGS. 14A and 14B, in a fifth modification, one of the first terminal 22 and the second terminal 24 is arranged symmetrically on both sides of the other. Specifically, the first terminal 22 is connected to the first outer terminal 70a of the power supply device 20. The second terminal 24 is connected to the second outer terminal 70b of the power supply device 20. The second terminal 24 branches into branch portions 24A and 24B. The branch portions 24A and 24B are symmetrically disposed on both sides of the first terminal 22 in the longitudinal direction (the direction in which the pair of electrodes 6 and 8 is connected) of the microchip 2. A distance between the branch portion 24A and the first terminal 22, a distance between the branch portion 24B and the first terminal 22, and a distance between the electrodes 6 and 8 are equal to each other.

The installation unit moving unit 36 moves the position of the installation unit 12. Specifically, the installation unit moving unit 36 is, for example, a slide table, and is controlled by the control device 10 to move the installation unit 12 in the longitudinal direction (the direction in which the pair of electrodes 6 and 8 is connected) of the microchip 2. As the installation unit moving unit 36, for example, a ball screw or a cylinder device can be used. As an example, when moving the installation unit 12, the installation unit moving unit 36 moves the installation unit 12 to separate the first terminal 22 and the second terminal 24 from the pair of electrodes 6 and 8, and after the movement, brings the first terminal 22 and the second terminal 24 into contact with the pair of electrodes 6 and 8. Note that the first terminal 22 and the second terminal 24 may be moved by a drive unit (not illustrated) to separate or bring the first terminal 22 and the second terminal 24 into contact with the pair of electrodes 6 and 8.

Further, in this modification, as in the second modification, the installation unit moving unit 36 as the changing unit is provided. The installation unit moving unit 36 moves the position of the installation unit 12 and switches the combination of the pair of electrodes 6 and 8, and the first terminal 22 and the second terminal 24.

In this modification, one (second terminal 24) of the first terminal 22 and the second terminal 24 is disposed symmetrically on both sides of the other (first terminal 22). When the installation unit moving unit 36 moves the position of the installation unit 12, the combination of the pair of electrodes 6 and 8, and the first terminal 22 and the second terminal 24 can be switched.

Other Exemplary Embodiments

Although an example of the exemplary embodiment of the disclosure has been described above, the exemplary embodiment of the present disclosure is not limited to the above, and it is a matter of course that various modifications can be made without departing from the gist of the present disclosure in addition to the above.

The configurations of the control device 10, the power supply device 20, and the analysis device 26 are examples, and can be appropriately changed.

What is claimed is:

1. An analysis system configured to electrophorese a sample in a capillary by applying a voltage to a pair of electrodes in an analysis tool including an electrophoresis microchip provided with a capillary channel and the pair of electrodes, one electrode of the pair located at each end of the capillary, the analysis system comprising:
    an installation unit in which the analysis tool is installed;
    a first terminal and a second terminal respectively in contact with one and the other of the pair of electrodes of the analysis tool installed in the installation unit;
    a voltage application unit connected to the first terminal and the second terminal configured to apply a voltage into the capillary; and
    a changing unit operably driven by a motor and configured to change a combination of electrical connections between the pair of electrodes, and the first terminal and the second terminal.

2. The analysis system according to claim 1, further comprising a terminal moving unit configured to move the first terminal and the second terminal as the changing unit.

3. The analysis system according to claim 2, wherein the terminal moving unit switches positions of the first terminal and the second terminal.

4. The analysis system according to claim 1, further comprising an installation unit moving table configured to move a position of the installation unit as the changing unit.

5. The analysis system according to claim 4, wherein the installation unit moving table rotates the installation unit to switch positions of the pair of electrodes.

6. The analysis system according to claim 1, further comprising, as the changing unit,
    a terminal moving unit configured to move one of the first terminal and the second terminal while maintaining an interval between the first terminal and the second terminal; and
    an installation unit moving table configured to move a position of the installation unit and switch a combination of the pair of electrodes and the first terminal and the second terminal.

7. The analysis system according to claim 1, further comprising a commutator provided between the first terminal and the second terminal as the changing unit.

8. The analysis system according to claim 1, further comprising a converter including a plurality of armatures, the converter provided between the first terminal and the second terminal and the voltage application unit as the changing unit.

9. The analysis system according to claim 1, wherein
    one of the first terminal and the second terminal is disposed symmetrically on both sides of the other, and
    the analysis system further comprises an installation unit moving table configured to move the installation unit to another position and switch a combination of the pair of electrodes and the first terminal and the second terminal as the changing unit.

10. An analysis method comprising:
installing an analysis tool including an electrophoresis microchip provided with a capillary channel and a pair of electrodes, one electrode of the pair located at each end of a capillary, in an installation unit;
receiving, via an input device, an instruction of an operation mode indicating either a forward polarity or a reverse polarity of a voltage to be applied to the analysis tool;
determining whether or not it is necessary to change a combination of electrical connections between the pair of electrodes, and a first terminal and a second terminal respectively in contact with one and the other of the pair of electrodes based on the instruction;
causing, by way of a motor, a changing unit to move the first terminal and the second terminal such that the combination of the electrical connections between the pair of electrodes, and the first terminal and the second terminal becomes a combination based on the instruction in a case in which it is necessary to change the combination;
connecting the pair of electrodes to the first terminal and the second terminal by a predetermined combination of electrical connections consistent with the combination based on the instruction; and
applying a voltage to the pair of electrodes of the analysis tool to electrophorese a sample in the capillary.

* * * * *